(12) United States Patent
Genier et al.

(10) Patent No.: US 9,285,086 B2
(45) Date of Patent: Mar. 15, 2016

(54) LIGHT DIFFUSING OPTICAL FIBERS AND LIGHT EMITTING APPARATUSES INCLUDING LIGHT DIFFUSING OPTICAL FIBERS

(71) Applicant: Corning Incorporated, Corning, NY (US)

(72) Inventors: Michael Lucien Genier, Horseheads, NY (US); Vineet Tyagi, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 150 days.

(21) Appl. No.: 14/075,071

(22) Filed: Nov. 8, 2013

(65) Prior Publication Data

US 2015/0131306 A1    May 14, 2015

(51) Int. Cl.
*F21V 7/04* (2006.01)
*F21K 99/00* (2010.01)
*F21V 8/00* (2006.01)
*G02B 6/02* (2006.01)
*G02B 6/036* (2006.01)
*F21Y 101/02* (2006.01)

(52) U.S. Cl.
CPC . *F21K 9/52* (2013.01); *F21K 9/135* (2013.01); *G02B 6/001* (2013.01); *G02B 6/0006* (2013.01); *G02B 6/02052* (2013.01); *F21Y 2101/025* (2013.01); *G02B 6/0229* (2013.01); *G02B 6/03644* (2013.01)

(58) Field of Classification Search
CPC ........................................ F21K 9/52
USPC ........................................ 362/551
See application file for complete search history.

(56) References Cited

U.S. PATENT DOCUMENTS

| 223,898 | A | 1/1880 | Edison |
| 6,234,656 | B1 | 5/2001 | Hosseini et al. |
| 6,350,041 | B1 | 2/2002 | Tarsa et al. |
| 7,241,039 | B2 | 7/2007 | Hulse |
| 7,618,175 | B1 | 11/2009 | Hulse |
| 8,466,611 | B2 | 6/2013 | Negley et al. |
| 8,475,025 | B2 | 7/2013 | Ott et al. |
| 2004/0228144 | A1 | 11/2004 | Squicciarini |
| 2005/0095946 | A1* | 5/2005 | Fridrich ............ 445/29 |
| 2010/0238374 | A1 | 9/2010 | Ohse |
| 2011/0025205 | A1 | 2/2011 | Van Rijswick et al. |
| 2011/0122646 | A1 | 5/2011 | Bickham et al. |

(Continued)

FOREIGN PATENT DOCUMENTS

| WO | 2010/011299 | 1/2010 |
| WO | 2011/063214 | 5/2011 |

*Primary Examiner* — Anh Mai
*Assistant Examiner* — Hana Featherly
(74) *Attorney, Agent, or Firm* — Svetlana Z. Short; Brian Tent (57) ABSTRACT

Light diffusing optical fibers and light emitting apparatuses including light diffusing optical fibers are disclosed. In one embodiment, a light emitting apparatus includes a base, a transparent or translucent enclosure affixed to the base, a light diffusing optical fiber including a coiled filament enclosed within the enclosure, and a light source optically coupled to the light diffusing optical fiber. The coiled filament includes a glass core, an outer surface, and a plurality of light scattering structures situated within the coiled filament for scattering light through the outer surface of the coiled filament. The coiled filament has a loss in a range of 0.5 dB/turn to 10.0 dB/turn at a turn radius of less than 50 mm.

19 Claims, 7 Drawing Sheets

(56) References Cited

U.S. PATENT DOCUMENTS

2011/0305035 A1 12/2011 Bickham et al.
2012/0176770 A1 7/2012 Bohler et al.
2013/0088888 A1 4/2013 Fewkes et al.

* cited by examiner

LIGHT DIFFUSING OPTICAL FIBERS AND LIGHT EMITTING APPARATUSES INCLUDING LIGHT DIFFUSING OPTICAL FIBERS

BACKGROUND

1. Field

The present specification generally relates to optical fibers and light emitting apparatuses, and, more particularly, to light diffusing optical fibers and light emitting apparatuses including light diffusing optical fibers.

2. Technical Background

A variety of conventional lighting sources, such as Edison-type light bulbs, may be used to providing lighting for a variety of lighting applications. Conventional lighting sources may have drawbacks, such as high energy consumption, high heat production, short useful life, etc.

Optical fibers are used in a wide variety of applications in which light is delivered from a light source to a target region. For example, in some applications, such as lighting, signage, biological applications, etc., light diffusing optical fibers may be utilized such that light propagating through the light diffusing optical fiber is scattered radially outward along a length of the fiber, thereby illuminating the target region along the length of the fiber. However, existing light diffusing optical fibers fail to provide satisfactory illumination characteristics for some applications.

Accordingly, a need exists for alternative light diffusing optical fibers and light emitting apparatuses that include light diffusing optical fibers.

SUMMARY

According to one embodiment, a light emitting apparatus includes a base, a transparent or translucent enclosure affixed to the base, a light diffusing optical fiber including a coiled filament enclosed within the enclosure, and a light source optically coupled to the light diffusing optical fiber. The coiled filament includes a glass core, an outer surface, and a plurality of light scattering structures situated within the coiled filament for scattering light through the outer surface of the coiled filament. The coiled filament has a loss in a range of 0.5 dB/turn to 10.0 dB/turn at a turn radius of less than 50 mm. At least a portion of light emitted by the light source enters the light diffusing optical fiber and is scattered away from the glass core and through the outer surface of the coiled filament by the plurality of light scattering structures.

In another embodiment, a light emitting apparatus includes a light diffusing optical fiber including a coiled filament. The coiled filament includes a glass core, an outer surface, and a plurality of light scattering structures situated within the coiled filament for scattering light through the outer surface of the coiled filament. The coiled filament has a loss in a range of 0.5 dB/turn to 10.0 dB/turn at a turn radius of less than 50 mm.

In yet another embodiment, a light diffusing optical fiber includes a glass core, an outer surface, and a plurality of light scattering structures situated within the light diffusing optical fiber for scattering light through the outer surface of the light diffusing optical fiber. The light diffusing optical fiber has a loss in a range of 0.5 dB/turn to 10.0 dB/turn at a turn radius of less than 50 mm Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 5:
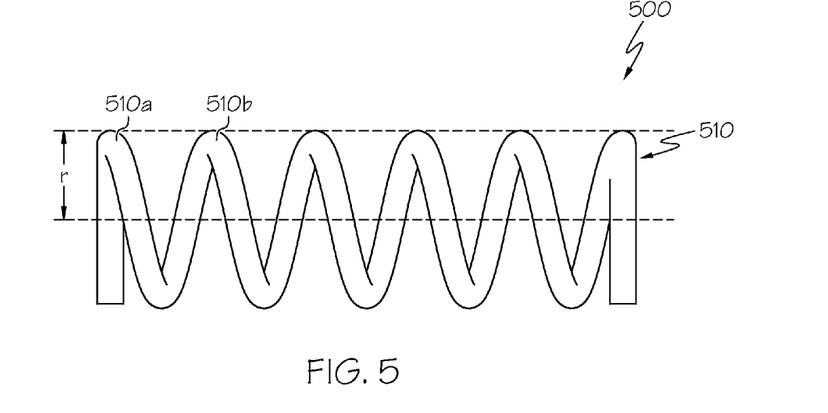
FIG. 5 schematically depicts a light emitting apparatus including a light diffusing optical fiber having a coiled filament configured in a spiral configuration, according to one or more embodiments shown and described herein.
Figure 9:
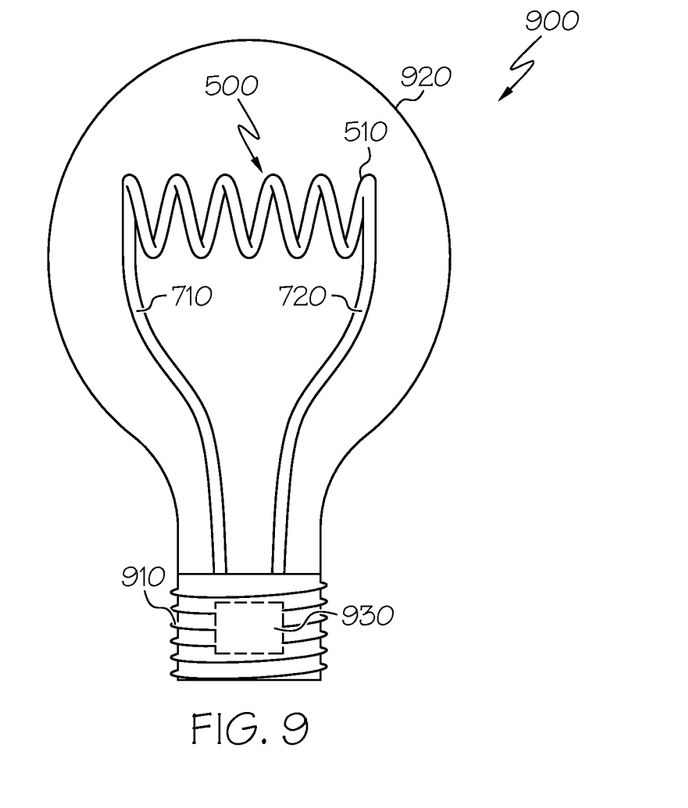
FIG. 9 schematically depicts a light emitting apparatus including a light diffusing fiber having a coiled filament enclosed within an enclosure affixed to a base, according to one or more embodiments shown and described herein.

Reference will now be made in detail to various embodiments of light diffusing fibers and light emitting apparatuses including light diffusing optical fibers, examples of which are illustrated in the accompanying drawings. Whenever possible, the same reference numerals will be used throughout the drawings to refer to the same or like parts. FIG. 5 schematically depicts a coiled filament of a light diffusing fiber having a loss in the range of 0.5 dB/turn to 10.0 dB/turn at a turn radius of less than 50 mm. Such a coiled filament light diffusing fiber may provide a high lumen output along the length of the coiled filament, may provide bright illumination, and may emulate the appearance of a conventional incandescent filament. FIG. 9 schematically depicts a light diffusing fiber coiled filament enclosed within a transparent or translucent enclosure, which may have a similar appearance to, may consume less power than, may produce less heat than, and may last longer than a conventional light bulb. Light diffusing fibers and light emitting apparatuses including light diffusing optical fibers are described in more detail herein with specific reference to the appended figures.

The following terminology will be used herein to describe the light diffusing optical fibers of the present specification:

The term "refractive index profile," as used herein, is the relationship between the refractive index or the relative refractive index and the radius of the fiber.

The term "relative refractive index percent," as used herein, is defined as:

$$\Delta(r)\% = 100 \times [n(r)^2 - n_{REF}^2]/2n(r)^2,$$

where n(r) is the refractive index at radius r, unless otherwise specified. The relative refractive index percent is defined at 850 nm unless otherwise specified. In one aspect, the reference index $n_{REF}$ is silica glass with the refractive index of 1.452498 at 850 nm. In another aspect, $n_{REF}$ is the maximum refractive index of the cladding at 850 nm. As used herein, the relative refractive index is represented by Δ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "step index profile" as used herein, refers to a relative refractive index profile, expressed in terms of Δ(r) which is in units of "%", where r is a given radius and $r_0$ is the radius of the core, which follows the equation:

$$\Delta(r)\% = 100 \times [n(r) - n_{REF}]/n_{REF}, \text{ when } r < r_0$$

$$\Delta(r)\% = 0, \text{ when } r > r_0$$

The term "updopant," as used herein, refers to a dopant which raises the refractive index of glass relative to pure undoped $SiO_2$. The term "downdopant," as used herein, is a dopant which has a propensity to lower the refractive index of glass relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

Figure 1A:
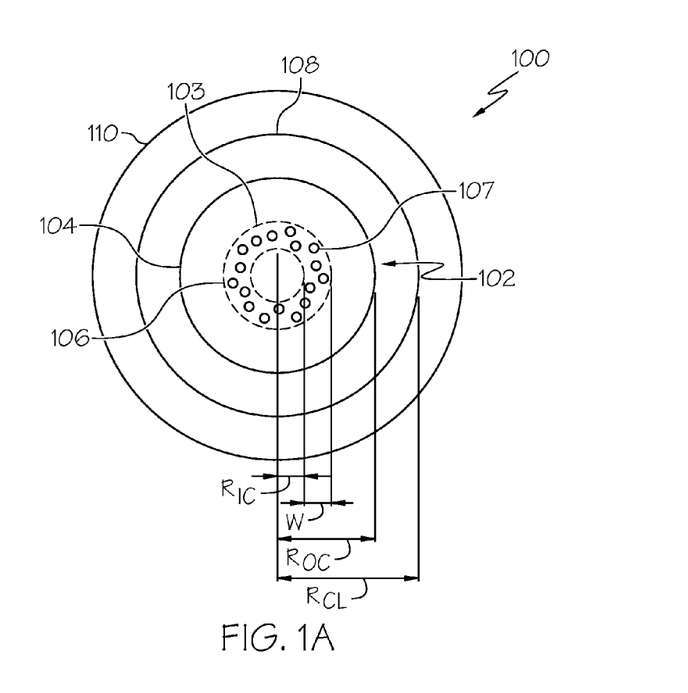
FIGS. 1A-1C schematically depict cross sections of light diffusing optical fibers having a plurality of light scattering structures in a core portion of the fibers, according to one or more embodiments shown and described herein.

Referring now to FIG. 1A, one embodiment of a light diffusing optical fiber 100 is schematically depicted. The light diffusing optical fiber 100 generally includes a core portion 102, with a light-scattering ring 106, and a cladding 108. In the embodiment shown in FIG. 1A, the core portion 102 is formed from silica-based glass and has an index of refraction n. The core portion 102 extends from the center line of the light diffusing optical fiber 100 to a radius $R_{OC}$. In some embodiments, the radius $R_{OC}$ of the core portion 102 may be such that 10 μm≤$R_{OC}$≤62.5 μm. In some embodiments, the radius $R_{OC}$ of the core portion 102 may be such that 50 μm≤$R_{OC}$≤100 μm. In some embodiments, the radius $R_{OC}$ of the core portion 102 may be about 90 μm. However, it should be understood that other embodiments may include a core portion 102 with a radius $R_{OC}$ other than the ranges explicitly described herein.

In some embodiments, one or more segments of the refractive index profile of the core portion 102 have a step index profile. In some embodiments, the refractive index of the core portion may have a centerline dip, wherein the maximum refractive index of the core, and the maximum refractive index of the entire optical fiber, is located a small distance away from long axis 105 of the light diffusing optical fiber 100. However, in other embodiments the refractive index of the core portion 102 has no centerline dip, and the maximum refractive index of the core portion 102, and the maximum refractive index of the entire light diffusing optical fiber is located at the centerline.

The light-scattering ring 106 of the core portion is formed from silica-based glass and generally includes a plurality of light scattering structures 107. In some embodiments, the width W of the light-scattering ring 106 is 0.1 Roc≤W≤Roc. In some embodiments, the width W of the light-scattering ring 106 is between about 5 μm to about 100 μm. The average refractive index $n_2$ of the light-scattering ring 106 is lowered relative to silica glass due to the presence of the plurality of light scattering structures 107.

In some embodiments, the plurality of light scattering structures 107 may be a plurality of nano-sized voids, such as nano-sized voids having a diameter of about 50 nm to about 2 μm. In some embodiments in which the plurality of light scattering structures 107 are a plurality of nano-sized voids, the nano-sized voids have a length of about 0.5 mm to about 1 m. The nano-sized voids are voids in the sense that they do not contain glass. However, in embodiments described herein, the voids may be filled with a gas which is introduced into the voids during formation of the optical fiber preform from which the fiber is drawn. For example, the nano-sized voids may be filled with $SO_2$, Kr, Ar, $CO_2$, $N_2$, $O_2$, or mixtures thereof. Alternatively, the nano-sized voids may be substantially devoid of any gas. In other embodiments, the plurality of light scattering structures may be light scattering particles, such as fluorescent particles or phosphorescent particles. For example, some embodiments that include light scattering particles may include light scattering particles comprising $TiO_2$ or $SiO_2$ or any other inorganic or organic material.

The light scattering structures 107 are utilized to scatter light propagating in the core portion 102 of the light diffusing optical fiber 100 such that the light is directed radially outward from the core portion 102 through the outer surface, thereby illuminating the light diffusing optical fiber 100 and the space surrounding the light diffusing optical fiber 100.

In the embodiments described herein, the light-scattering ring 106 may be located at different positions in the core portion 102 in order to achieve the desired increase in scattering-induced attenuation losses. Referring to the embodiment of the light diffusing optical fiber 100 depicted in FIG. 1A, the light-scattering ring 106 is positioned within the core portion 102. Specifically, in this embodiment, the core portion 102 includes an inner core portion 103 and an outer core portion 104 which are separated by the light-scattering ring 106, which includes the plurality of light scattering structures 107. The light-scattering ring 106 surrounds the inner core portion 103 and is in direct contact with both the inner core portion 103 and the outer core portion 104. The inner core portion 103 may be formed from silica-based glass and have an index of refraction $n_1$. The outer core portion 104 may also be formed from silica-based glass and have an index of refraction $n_3$. In general, the index of refraction $n_1$ of the inner core portion 103 and the index of refraction $n_3$ of the outer core portion 104 are greater than the index of refraction $n_2$ of the light-scattering ring 106.

In some embodiments, the inner core portion 103 has a radius $R_{IC}$ in the range of $0.1R_{OC} \leq R_{IC} \leq 0.9R_{OC}$. In some embodiments, the inner core portion 103 has a radius $R_{IC}$ in the range of $0.1R_{OC} \leq R_{IC} < 0.6R_{OC}$.

Still referring to FIG. 1A, the light diffusing optical fiber 100 may further comprise a cladding 108 which surrounds and is in direct contact with the core portion 102. The cladding 108 may be formed from a material which has a low refractive index in order to increase the numerical aperture (NA) of the light diffusing optical fiber 100. In some embodiments, the numerical aperture of the fiber may be less than 0.2. For example, the numerical aperture of the light diffusing optical fiber 100 may be greater than 0.1, more preferably greater than 0.15. In some embodiments, the numerical aperture of the light diffusing optical fiber 100 may be in the range of 0.1 to 0.2. In some embodiments, the numerical aperture of the light diffusing optical fiber 100 may be in the range of 0.15 to 0.2. In one embodiment, the cladding 108 may be formed from a low index polymeric material such as UV or thermally curable fluoroacrylate or silicone. In other embodiments the cladding 108 may be formed from silica glass which is down-doped with a down-dopant, such as, for example, fluorine. The cladding 108 generally has an index of refraction $n_4$ which is less than the index of refraction of the core portion 102, and, more specifically, less than the index of refraction $n_1$ of the inner core portion 103 and the index of refraction $n_3$ of the outer core portion 104. In some embodiments, the index of refraction $n_4$ of the cladding 108 may be less than the index of refraction $n_3$ of the light-scattering ring 106. In one particular embodiment, the cladding 108 is a low index polymer cladding with a relative refractive index that is negative relative to silica glass. For example, the relative refractive index of the cladding may be less than about –0.5% and even more preferably less than –0.75%.

The cladding 108 generally extends from the outer radius $R_{OC}$ of the core portion 102 to a radius $R_{CL}$. In some embodiments, the radial width of the cladding 108 (i.e., $R_{CL}-R_{OC}$) is greater than about 10 µm. In some embodiments, the radial width of the cladding 108 (i.e., $R_{CL}-R_{OC}$) is greater than about 15 µm.

Figure 2:
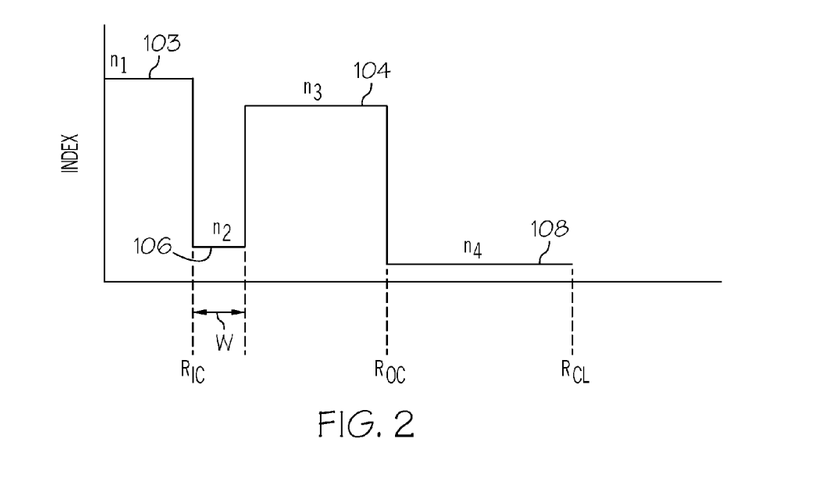
FIG. 2 schematically depicts a refractive index profile of the light diffusing optical fiber of FIG. 1A, according to one or more embodiments shown and described herein.

Referring to FIGS. 1A and 2, FIG. 2 graphically depicts a refractive index profile of the light diffusing optical fiber 100 of FIG. 1A. As shown in FIG. 2, the index of refraction $n_1$ of the inner core portion 103 and the index of refraction $n_3$ of the outer core portion 104 are greater than the index of refraction $n_2$ of the light-scattering ring 106. For example, in the embodiment shown in FIG. 1A, the inner core portion 103 and the outer core portion 104 may be formed from silica-based glass which includes dopants, such as Ge, Al, P or similar updopants, such that the index of refraction $n_1$ of the inner core portion 103 and the index of refraction $n_3$ of the outer core portion 104 are greater than the index of refraction of un-doped silica glass of the light-scattering ring 106. Moreover, in this example, the relative amounts and/or types of dopants used in the inner core portion 103 and the outer core portion 104 may be different such that $n_1 > n_3$, as depicted in the refractive index profile shown in FIG. 2. Further, the light-scattering ring 106 may be formed with down-doped silica glass such that the index of refraction $n_2$ of the light-scattering ring is significantly less than the indices of refraction of either the inner core portion 103 or the outer core portion 104. In this exemplary refractive index profile $n_1 > n_3 > n_2 > n_4$.

For example, while inner core portion 103, the outer core portion 104 and the light-scattering ring 106 have been described herein as comprising dopants, it should be understood that one or more of these portions may be formed without dopants so long as $n_1$ and $n_3$ are greater than $n_2$. For example, in one embodiment, the inner core portion 103 and the outer core portion 104 may be formed without dopants while the light-scattering ring 106 is down-doped. Alternatively, the inner core portion 103 and the outer core portion 104 may be up-doped while the light-scattering ring 106 is formed without dopants.

Figure 4:
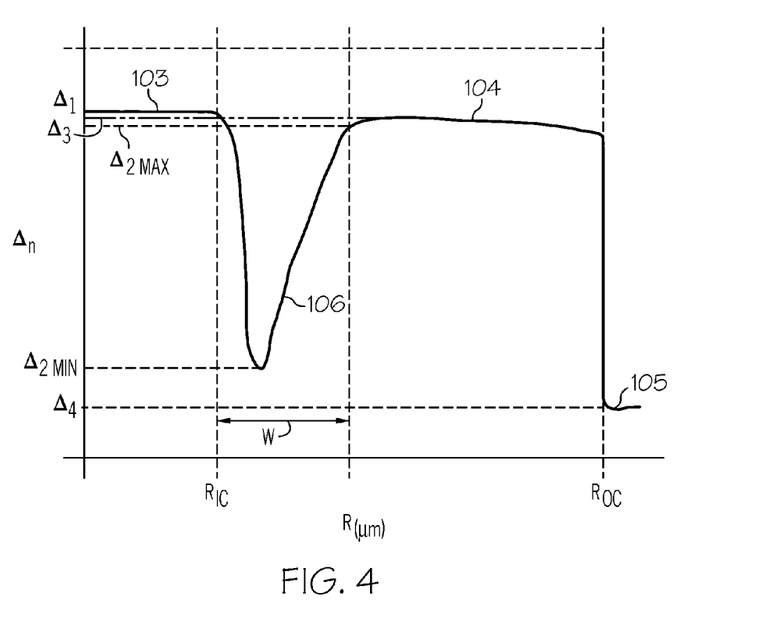
FIG. 4 schematically depicts a relative refractive index profile of the light diffusing optical fiber of FIG. 1A, according to one or more embodiments shown and described herein.

Referring now to FIGS. 1A, 2 and 4, an exemplary relative refractive index profile for the core portion and cladding portion of the light diffusing optical fiber 100 shown in FIG. 1A is graphically depicted. The reference index $n_{REF}$ is the refractive index of the cladding 108. In this embodiment, the inner core portion 103 has a relative refractive index profile $\Delta 1$ corresponding to a maximum refractive index $n_1$ which, in this embodiment, is constant. The light-scattering ring 106 has minimum refractive index $n_2$, a relative refractive index profile $\Delta 2(r)$, a maximum relative refractive index $\Delta 2_{MAX}$, and a minimum relative refractive index $\Delta 2_{MIN}$. The outer core portion 104 has a relative refractive index profile $\Delta 3(r)$ with a maximum relative refractive index $\Delta 3_{MAX}$ corresponding to a maximum refractive index $n_3$ which, in this embodiment, is constant. In this embodiment the cladding 108 has a relative refractive index profile $\Delta 4(r)$ corresponding to a refractive index $n_4$ which, in this embodiment, is constant. In this embodiment the refractive indices of the regions have the following relationship $n_1 > n_3 > n_2 > n_4$.

Referring again to FIG. 1A, the light diffusing optical fiber 100 may optionally include a coating layer 110 which surrounds and is in direct contact with the cladding 108. For example, in one embodiment, the coating layer 110 comprises a low modulus primary coating layer and a high modulus secondary coating layer which surrounds the low modulus primary coating layer. In some embodiments, the coating layer 110 comprises a polymer coating such as an acrylate-based or silicone based polymer. In at least some embodiments, the coating layer 110 has a constant diameter along the length of the light diffusing optical fiber.

In some embodiments, the coating layer 110 may be utilized to enhance the distribution and/or the nature of the light emitted radially from the core portion 102 and passed through the cladding 108. For example, in some embodiments, the coating layer 110 may include a scattering material on the outer-most surface of the coating layer 110. The scattering material may contain $TiO_2$-based white ink which provides for an angular distribution of light scattered from the core portion 102 of the light diffusing optical fiber 100. For example, in some embodiments, the ink layer may have a thickness of about 1 µm to about 5 µm. In other embodiments, the thickness of the ink layer and/or the concentration of the pigment in the ink layer may be varied, along the axial length of the fiber so as to provide more uniform variation in the intensity of light scattered from the light diffusing optical fiber 100 at large angles (i.e., angles greater than about 15 degrees).

Alternatively or additionally, the coating layer 110 may contain a fluorescent material that converts light scattered from the core portion 102 to a longer wavelength of light. In some embodiments, white light can be emitted from the light diffusing optical fiber by coupling the light diffusing optical fiber 100 with such a fluorescent material in the coating layer 110 to a UV light source such as, for example, a 405 nm or 445 nm UV LED. The UV light from the light source that is scattered from the core portion 102 and excite fluorescence from the material in the coating layer such that white light is emitted from the light diffusing optical fiber 100.

Figure 1B:
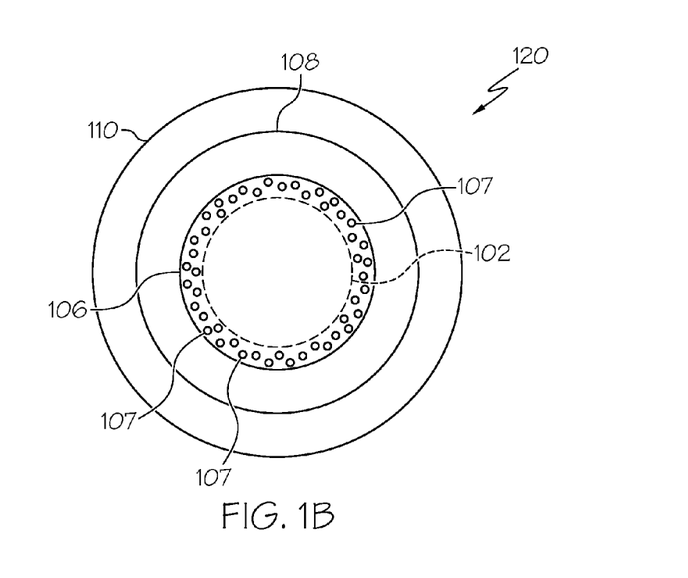
Figure 3:
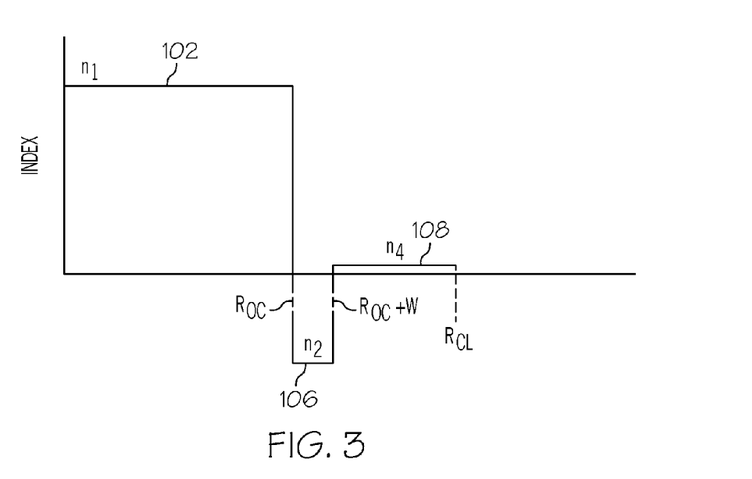
FIG. 3 schematically depicts a refractive index profile of the light diffusing optical fiber of FIG. 1B, according to one or more embodiments shown and described herein.

Referring now to FIGS. 1B and 3, in another embodiment, the light diffusing optical fiber 120 includes a core portion 102 with a light-scattering ring 106, a cladding 108, and a coating layer 110, as described above. However, in this embodiment, the light-scattering ring 106 is the outermost region of the core portion 102 such that the cladding 108 surrounds and is in direct contact with the light-scattering ring 106. The light-scattering ring 106 includes a plurality of light scattering structures. Moreover, in this embodiment, the core portion 102 may have a step refractive index profile, as described hereinabove. In this embodiment, the refractive index $n_1$ of the core portion 102 is generally greater than the refractive index $n_4$ of the cladding 108 which, in turn, has a refractive index greater than the light-scattering ring 106 such that $n_1 > n_4 > n_2$, as depicted in FIG. 3.

Figure 1C:
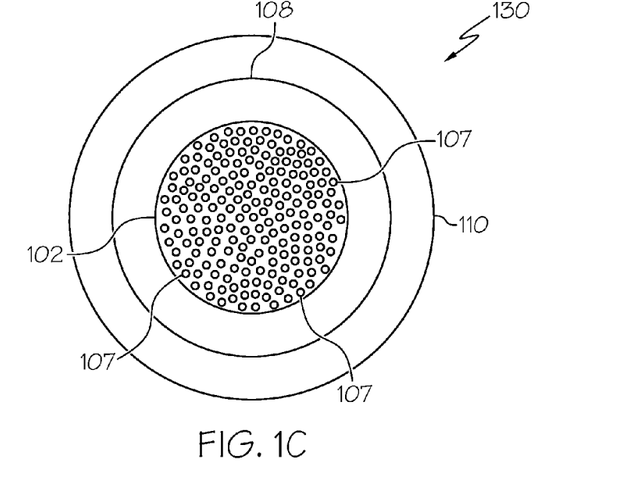

Referring now to FIG. 1C, in another embodiment, the light diffusing optical fiber 130, includes a core portion 102, a cladding 108 and a coating layer 110, as described hereinabove with respect to FIGS. 1A and 1B. However, in this embodiment, the entirety of the core portion 102 contains light scattering structures 107. In this embodiment, the core portion 102 may have a step refractive index profile, as described hereinabove.

Referring now to FIG. 5, one embodiment of a light emitting apparatus including a light diffusing optical fiber 500 is schematically depicted. The light diffusing optical fiber 500 may be the light diffusing optical fiber 100 of FIG. 1A, the light diffusing optical fiber 120 of FIG. 1B, the light diffusing optical fiber 130 of FIG. 1C, or a light diffusing optical fiber having a structure or composition other than those described above. The light diffusing optical fiber 500 includes a coiled filament 510. The coiled filament 510 includes a glass core, an outer surface, and a plurality of light scattering structures situated within the coiled filament for scattering light through the outer surface of the coiled filament 510. For example, with reference to FIGS. 1A-1C and 5, in embodiments in which the light diffusing optical fiber 500 is the light diffusing optical fiber 100 of FIG. 1A, the light diffusing optical fiber 120 of FIG. 1B, to the light diffusing optical fiber 130 of FIG. 1C, the coiled filament 510 includes a glass core portion 102, an outer surface, and a plurality of light scattering structures 107 situated within the coiled filament 510 for scattering light through the outer surface of the coiled filament 510.

Referring once again to FIG. 5, the coiled filament 510 has a radius r. In some embodiments, the radius r of the coiled filament 510 is less than 50 mm. In some embodiments, the radius r of the coiled filament 510 is less than 25 mm. In other embodiments, the radius r of the coiled filament 510 is less than 15 mm. In still other embodiments, the radius r of the coiled filament 510 is less than 7.5 mm. In some embodiments, the radius r of the coiled filament 510 is in the range of 4 mm to 30 mm. By tightly coiling the coiled filament 510, a higher lumen output per length can be achieved as compared to an uncoiled or loosely coiled segment of light diffusing optical fiber, which may be desirable in lighting applications in which more bright light is desired in a particular location. While the coiled filament 510 is depicted in FIG. 5 as including a plurality of circular coils, it should be understood that in other embodiments, the coiled filament 510 may have elliptical coils, or coils of other configurations.

Still referring to FIG. 5, the coiled filament 510 has a loss in the range of 0.5 dB/turn to 10.0 dB/turn at a turn radius of less than 50 mm. The loss may be measured by injecting light having a wavelength into one end of the coiled filament 510 and measuring the loss through a full turn of the coiled filament. The 0.5 dB/turn to 10.0 dB/turn loss of the coiled filament 510 ensures that the coiled filament 510 is brightly illuminated along a length of the coiled filament 510 and may emulate the appearance of a conventional incandescent filament. In some embodiments, the light diffusing optical fiber 500 has a baseline loss in the range from 0.02 dB/m to 1 dB/in due to scattering induced by the plurality of light scattering structures. In some embodiments, the coiled filament 510 includes a number of turns. In some embodiments, the number of turns may range from 1 to 20, such that the coiled filament 510 has a loss of 10 dB over a length of the coiled filament 510. For example, in one embodiment in which the coiled filament 510 includes 20 turns and has a loss of 10.0 dB/turn, the coiled filament 510 has a loss of 10 dB over a length of the coiled filament 510, such that approximately 90% of the light will be dissipated over the length of the 20-turn coiled filament 510. By way of another non-limiting example, in one embodiment in which the coiled filament 510 includes 1 turn and has a loss of 10.0 dB/turn, the coiled filament 510 has a loss of 10 dB over a length of the coiled filament 510, such that approximately 90% of the light will be dissipated across the length of the 1-turn coiled filament 510. It should be understood that by adjusting the radius and/or number of coils of the coiled filament 510 along with the dB/turn loss of the light diffusing fiber from which the coiled filament 510 is formed, the emission characteristics of the coiled filament 510 may be varied. Bending loss generally increases with increasing coil radius.

Still referring to FIG. 5, the depicted coiled filament 510 is configured in a spiral configuration in which adjacent coils 510a, 510b do not contact one another. While the coiled filament 510 is depicted as having uniformly spaced coils, it should be understood that coils may not be uniformly spaced in other embodiments, such as embodiments in which some adjacent coils are spaced farther apart than other adjacent coils. Furthermore, in some embodiments, at least one pair of adjacent coils may contact one another.

Furthermore, while the coils of the coiled filament 510 are depicted in FIG. 5 as being of the same radius r, it should be understood that in other embodiments, the coiled filament 510 may include coils of varying radii, such as in embodiments in which a radius of the coils increases or decreases across a length of the coiled filament 510. By varying the radius of the coils across a length of the coiled filament 510, the illumination characteristics of the coiled filament 510 can be controlled, such as by increasing the radius of the coils across the coiled filament 510 (e.g., from an input end of the coiled filament 510 to an output end of the coiled filament 510) so that the light emitted from the coiled filament 510 has a uniform emission profile.

Figure 6:
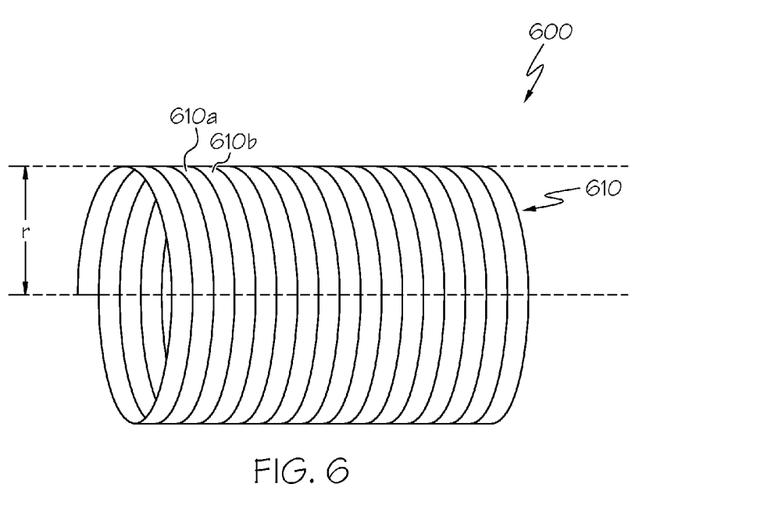
FIG. 6 schematically depicts a light emitting apparatus including a light diffusing optical fiber having a coiled filament configured in a compressed configuration, according to one or more embodiments shown and described herein.

Referring now to FIG. 6, one embodiment of a light emitting apparatus including a light diffusing optical fiber 600 is schematically depicted. The light diffusing optical fiber 600 may be the light diffusing optical fiber 100 of FIG. 1A, the light diffusing optical fiber 120 of FIG. 1B, the light diffusing optical fiber 130 of FIG. 1C, or a light diffusing optical fiber having a structure or composition other than those described above. The light diffusing optical fiber 600 includes a coiled filament 610. The coiled filament 610 includes a glass core, an outer surface, and a plurality of light scattering structures situated within the coiled filament for scattering light through the outer surface of the coiled filament 610. For example, with reference to FIGS. 1A-1C and 6, in embodiments in which the light diffusing optical fiber 600 is the light diffusing optical fiber 100 of FIG. 1A, the light diffusing optical fiber 120 of FIG. 1B, or the light diffusing optical fiber 130 of FIG. 1C, the coiled filament 610 includes a glass core portion 102, an outer surface, and a plurality of light scattering structures 107 situated within the coiled filament 610 for scattering light through the outer surface of the coiled filament 610.

Referring once again to FIG. 6, the coiled filament 610 has a radius r. In some embodiments, the radius r of the coiled filament 610 is less than 50 mm. In some embodiments, the radius r of the coiled filament 610 is less than 25 mm. In other embodiments, the radius r of the coiled filament 610 is less than 15 mm. In still other embodiments, the radius r of the coiled filament 610 is less than 7.5 mm. In some embodiments, the radius r of the coiled filament 610 is in the range of 4 mm to 30 mm. By tightly coiling the coiled filament 610, a higher lumen output per length can be achieved as compared to an uncoiled or loosely coiled segment of light diffusing optical fiber, which may be desirable in lighting applications in which more bright light is desired in a particular location. While the coiled filament 610 is depicted in FIG. 6 as including a plurality of circular coils, it should be understood that in other embodiments, the coiled filament 610 may have elliptical coils, or coils of other configurations.

Still referring to FIG. 6, the coiled filament 610 has a loss in the range of 0.5 dB/turn to 10.0 dB/turn at a turn radius of less than 50 mm. The loss may be measured by injecting light having a wavelength into one end of the coiled filament 610 and measuring the loss through a full turn of the coiled filament. The 0.5 dB/turn to 10.0 dB/turn loss of the coiled filament 610 ensures that the coiled filament 610 is brightly illuminated along a length of the coiled filament 610 and may emulate the appearance of a conventional incandescent filament. In some embodiments, the light diffusing optical fiber 600 has a baseline loss in the range from 0.02 dB/m to 1 dB/m due to scattering induced by the plurality of light scattering structures. In some embodiments, the coiled filament 610 includes a number of turns. In some embodiments, the number of turns may range from 1 to 20, such that the coiled filament 610 has a loss of 10 dB over a length of the coiled filament 610. For example, in one embodiment in which the coiled filament 610 includes 20 turns and has a loss of 10.0 dB/turn, the coiled filament 610 has a loss of 10 dB over a length of the coiled filament 610, such that approximately 90% of the light will be dissipated over the length of the 20-turn coiled filament 610. By way of another non-limiting example, in one embodiment in which the coiled filament 610 includes 1 turn and has a loss of 10.0 dB/turn, the coiled filament 610 has a loss of 10 dB over a length of the coiled filament 610, such that approximately 90% of the light will be dissipated across the length of the 1-turn coiled filament 610. It should be understood that by adjusting the radius and/or number of coils of the coiled filament 610 along with the dB/turn loss of the light diffusing fiber from which the coiled filament 610 is formed, the emission characteristics of the coiled filament 610 may be varied, as described above.

Still referring to FIG. 6, the depicted coiled filament 610 is configured in a compressed configuration in which adjacent coils 610a, 610b contact one another. While the coiled filament 610 is depicted as having all adjacent coils contact one another, it should be understood that all pairs of adjacent coils may not contact one another in some embodiments.

Figure 7:
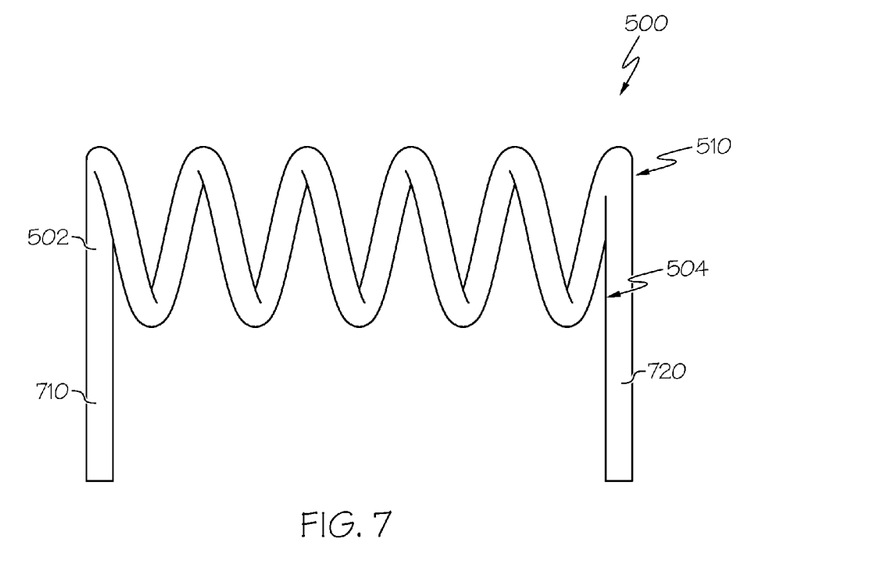
FIG. 7 schematically depicts a light emitting apparatus including a light diffusing optical fiber having fiber portions optically coupled to a coiled filament, according to one or more embodiments shown and described herein.

Referring now to FIG. 7, a light emitting apparatus including fiber portions optically coupled to the light diffusing optical fiber 500 of FIG. 5 is schematically depicted. Specifically, a first fiber portion 710 is optically coupled to a first end 502 of the coiled filament 510, and a second fiber portion 720 is optically coupled to a second end 504 of the coiled filament 510. Light injected into the first fiber portion 710 and/or the second fiber portion 720 may traverse through the fiber portion and into the coiled filament 510, and may be emitted from the coiled filament 510.

In some embodiments, the first fiber portion 710 and the second fiber portion 720 are portions of light diffusing optical fiber. In some such embodiments, the first fiber portion 710, the second fiber portion 720, and the coiled filament 510 may be portions of the same light diffusing optical fibers. In other embodiments in which the first fiber portion 710 and the second fiber portion 720 are portions of light diffusing optical fiber, the first fiber portion 710 and/or the second fiber portion 720 may be a separate light diffusing optical fiber that is affixed to and optically coupled to the coiled filament 510. In embodiments in which the first fiber portion 710 and the second fiber portion 720 are portions of light diffusing optical fiber, less intense light per unit length may be emitted along the length of the first fiber portion 710 and the second fiber portion 720 as compared to the more intense light per unit length emitted from the coiled filament 510.

In some embodiments, the first fiber portion 710 and the second fiber portion 720 are a first optical transmission fiber and a second optical transmission fiber, respectively, that are affixed to and optically coupled to the coiled filament 510. In such embodiments, no or a minimal amount of light may be emitted along the length of the first fiber portion 710 and the second fiber portion 720, while intense light may be emitted from the coiled filament 510.

While the light diffusing optical fiber 500 of FIG. 5 is depicted as optically coupled to the first fiber portion 710 and the second fiber portion 720 in FIG. 7, it should be understood that in other embodiments, a different light diffusing optical fiber, such as the light diffusing optical fiber 600 of FIG. 6, may be optically coupled to the first fiber portion 710 and the second fiber portion 720.

Figure 10A:
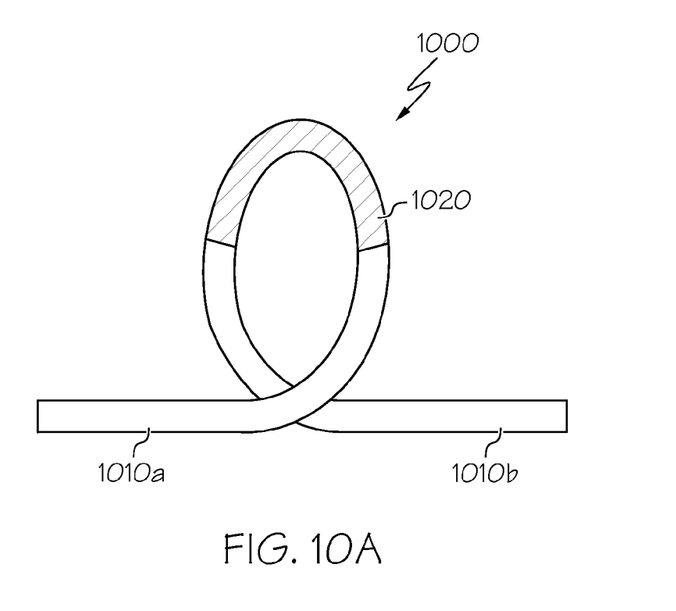
FIG. 10A schematically depicts a side view of a coil including a light diffusing optical fiber segment and optical transmission fiber segments, according to one or more embodiments shown and described herein.
Figure 10B:
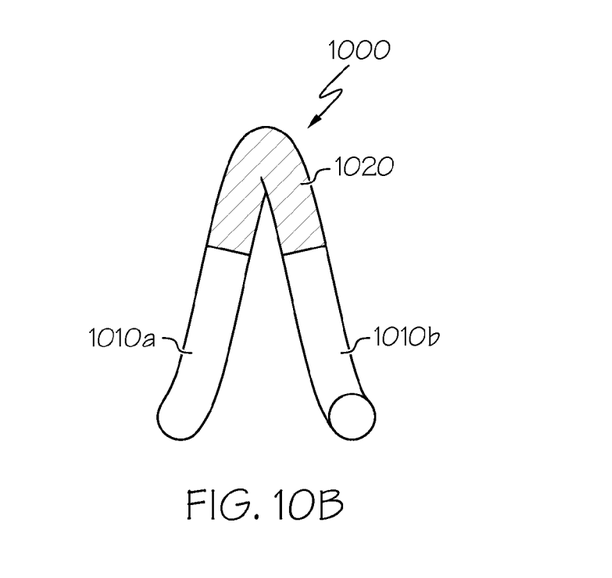
FIG. 10B schematically depicts a front view of a coil including a light diffusing optical fiber segment and optical transmission fiber segments, according to one or more embodiments shown and described herein.

While the coils of the coiled filament 510 and the coiled filament 610 are depicted and described as coils of light diffusing optical fiber, in other embodiments, only a portion of one or more of the coils of the coiled filament 510 or the coiled filament 610 may be formed from a light diffusing optical fiber. For example, in some embodiments, one or more of the coils of the coiled filament 510 or the coiled filament 610 may include at least one light diffusing optical fiber segment and at least one optical transmission fiber segment. Referring now to FIGS. 10A (depicting a side view of a coil 1000) and 10B (depicting a front view of a coil 1000), one such embodiment is schematically depicted, in which the coil 1000 includes a first optical transmission fiber segment 1010a that is optically coupled to a light diffusing optical fiber segment 1020, which in turn is optically coupled to a second optical transmission fiber segment 1010b. In such embodiments, only a portion of the coil 1000 (e.g., one fourth to one half of the coil) may be formed from light diffusing optical fiber. A coil that includes at least one light diffusing optical fiber segment and at least one optical transmission fiber segment may provide desirable illumination characteristics and may provide for a desirable way to manufacture coiled filaments that include sharp bends.

Figure 8:
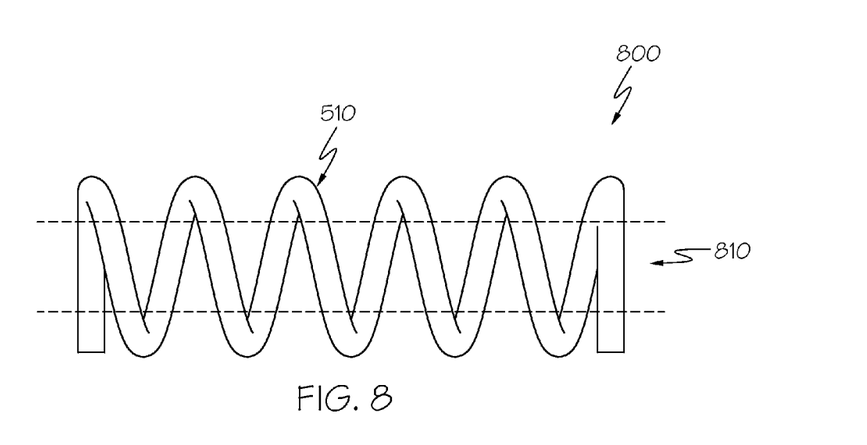
FIG. 8 schematically depicts a light emitting apparatus including a coiled filament on a support structure, according to one or more embodiments shown and described herein.

Referring now to FIG. 8, a light emitting apparatus 800 including a coiled filament 510 on a support structure 810 is schematically depicted. The coiled filament 510 may be attached to or wound around the support structure 810 along a length of the support structure. In some embodiments, the support structure may be a solid or hollow rod around which the coiled filament 510 is wound. In other embodiments, the coiled filament 510 may be attached to a support structure at or near an end of the coiled filament 510, but may not be attached to the support structure in the middle of the coiled filament 510. In some embodiments, the support structure 810 may be reflective or may be coated with a reflective material. The support structure 810 may assist the coiled filament 510 in maintaining its configuration and/or shape. The support structure 810 may also assist in maintaining the coiled filament 510 in a desired spatial location. While the coiled filament 510 of FIG. 5 is schematically depicted as being supported by the support structure 810 in FIG. 8, it should be understood that other embodiments may include a different coiled filament, such as the coiled filament 610 of FIG. 6. Furthermore, it should be understood that some embodiments may not include a support structure, such as in embodiments in which the coiled filament 510 is free standing.

Referring now to FIG. 9, a light emitting apparatus 900 is schematically depicted. The light emitting apparatus 900 includes a base 910, a transparent or translucent enclosure 920, the light diffusing optical fiber 500 of FIG. 5, and a light source 930. The transparent or translucent enclosure 920 is affixed to the base 910. The light diffusing optical fiber 500 includes a coiled filament 510 enclosed within the transparent or translucent enclosure 920.

In some embodiments, the base 910 may be a threaded screw base. In such embodiments, the base 910 may be adapted for screwing into a standard light bulb socket, such as an E5 socket, an E10 socket, an E11 socket, an E12 socket, an E14 socket, an E17 socket, an E26 socket, an E27 socket, an E29 socket, an E39, socket, an E40 socket, an automotive light socket, or the like. In other embodiments, the base 910 may be adapted to be inserted into a fluorescent light bulb socket, or any other type of standard light socket. The base 910 may also include electronics for electrically coupling power from a socket into which the base is inserted to the light source 930. In other embodiments, the base 910 may not be configured to be screwed into a threaded screw base, such as in embodiments in which the base 910 is a standalone structure.

The transparent or translucent enclosure 920 may be formed from any transparent or translucent material. For example, in some embodiments, the transparent or translucent enclosure 920 may be formed from plastic or glass. In some embodiments, the transparent or translucent enclosure may be frosted glass. The transparent or translucent enclosure 920 may be clear or may be colored. In some embodiments, the transparent or translucent enclosure 920 is coated with a fluorescent or scattering material, such as in embodiments in which the transparent or translucent enclosure 920 is coated with a fluorescent or scattering material, but the light diffusing optical fiber 500 is not so coated.

The light source 930 is optically coupled to the coiled filament 510 of the light diffusing optical fiber 500. In the embodiment depicted in FIG. 9, the light source 930 is optically coupled to the first fiber portion 710 and the second fiber portion 720, which were depicted in FIG. 7 and described above. In some embodiments, the light source 930 may be directly coupled to an end of the coiled filament 510. In some embodiments, the light source 930 may be optically coupled to only one end of the coiled filament 510 or a fiber portion extending from only one end of the coiled filament 510. In some embodiments, the fight source 930 may include a light-emitting diode or a laser diode. In some embodiments, the light source 930 may include a plurality of light emitting diodes or a plurality of laser diodes. In some embodiments, such as the embodiment depicted in FIG. 9, the light source 930 is affixed to the base 910.

When the light source 930 is energized, light emitted from the light source 930 is optically coupled to the coiled filament 510, such that at least a portion of the emitted light enters the light diffusing optical fiber 500 and is scattered away from the core and through the outer surface of the coiled filament 510 by the plurality of light scattering structures within the coiled filament 510. Such a light emitting apparatus 900, which emits light from the coiled filament 510 enclosed within the transparent or translucent enclosure 920, may have a similar appearance to, may consume less power than, may produce less heat than, and may last longer than a conventional (e.g., Edison-type light bulb).

It should now be understood that light emitting apparatuses including light diffusing optical fibers having coiled filaments, as described herein, may provide a high lumen output along the length of the coiled filament, may provide bright illumination per unit length, and may emulate the appearance of a conventional incandescent filament. Furthermore, it should be understood that light emitting apparatuses including light diffusing fiber coiled filaments enclosed within a transparent or translucent enclosure, as described herein, may have a similar appearance to, may consume less power than, may produce less heat than, and may last longer than a conventional light bulb.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A light emitting apparatus comprising:
   a base;
   a transparent or translucent enclosure affixed to the base;
   a light diffusing optical fiber comprising a coiled filament enclosed within the enclosure, wherein:
      the coiled filament comprises a glass core, an outer surface, and a plurality of light scattering structures situated within the coiled filament for scattering light through the outer surface of the coiled filament;
      the coiled filament has a loss in a range of 0.5 dB/turn to 10.0 dB/turn at a turn radius of less than 50 mm, and the light optical fiber has a baseline loss in the range from 0.02 dB/m to 1 dB/m due to scattering induced by the plurality of light scattering structures; and
   a light source at least partially enclosed by the base, wherein the light source is optically coupled to the light diffusing optical fiber, such that at least a portion of light emitted by the light source enters the light diffusing optical fiber and is scattered away from the glass core and through the outer surface of the coiled filament by the plurality of light scattering structures.

2. The light emitting apparatus of claim 1, wherein the coiled filament is configured in a spiral configuration in which adjacent coils of the coiled filament do not contact one another.

3. The light emitting apparatus of claim 1, wherein the coiled filament is configured in a compressed configuration in which at least one pair of adjacent coils of the coiled filament contact one another.

4. The light emitting apparatus of claim 1, wherein the light source comprises a light-emitting diode or a laser diode.

5. The light emitting apparatus of claim 1, wherein the base comprises a screw base adapted for screwing into a light bulb socket.

6. A light emitting apparatus comprising:
a base containing a light source;
a light diffusing optical fiber optically coupled to the light source and comprising a coiled filament, wherein:
the coiled filament comprises a glass core, an outer surface, and a plurality of light scattering structures situated within the coiled filament for scattering light through the outer surface of the coiled filament; and
the coiled filament has a loss in a range of 0.5 dB/turn to 10.0 dB/turn at a turn radius of less than 50 mm, and the light diffusing optical fiber has a baseline loss in the range from 0.02 dB/m to 1 dB/m due to scattering induced by the plurality of light scattering structures.

7. The light emitting apparatus of claim 6, wherein the coiled filament is configured in a spiral configuration in which adjacent coils of the coiled filament do not contact one another.

8. The light emitting apparatus of claim 6, wherein the coiled filament is configured in a compressed configuration in which at least one pair of adjacent coils of the coiled filament contact one another.

9. The light emitting apparatus of claim 6, further comprising a support structure, wherein the coiled filament is attached to the support structure or wound around the support structure along a length of the support structure.

10. The light emitting apparatus of claim 6, wherein the light diffusing optical fiber further comprises a first fiber portion and a second fiber portion, wherein the first fiber portion is optically coupled to a first end of the coiled filament and the second fiber portion is optically coupled to a second end of the coiled filament.

11. The light emitting apparatus of claim 6, further comprising a first optical transmission fiber and a second optical transmission fiber, wherein the first optical transmission fiber is optically coupled to a first end of the coiled filament and the second optical transmission fiber is optically coupled to a second end of the coiled filament.

12. The light emitting apparatus of claim 6, wherein the coiled filament includes a number of coils, wherein a diameter of coils of the coiled filament varies across a length of the coiled filament.

13. A light diffusing optical fiber comprising a glass core, an outer surface, and a plurality of light scattering structures situated within the light diffusing optical fiber for scattering light through the outer surface of the light diffusing optical fiber, wherein the light diffusing optical fiber has a loss in a range of 0.5 dB/turn to 10.0 dB/turn at a turn radius of less than 50 mm, and a baseline loss in the range from 0.02 dB/m to 1 dB/m due to scattering induced by the plurality of light scattering structures.

14. The light diffusing optical fiber of claim 13, wherein a numerical aperture of the light diffusing optical fiber is less than 0.2.

15. The light diffusing optical fiber of claim 13, wherein the turn radius is in the range from 4 mm to 30 mm.

16. The light diffusing optical fiber of claim 13, wherein a core portion of the light diffusing optical fiber includes the plurality of light scattering structures.

17. The light diffusing optical fiber of claim 13, wherein the light diffusing optical fiber includes a coiled filament comprising a number of coils.

18. The light diffusing optical fiber of claim 17, wherein the number of coils are between 1 and 20.

19. The light diffusing optical fiber of claim 18, wherein a total loss across a length of the coiled filament is about 10 dB.

* * * * *